United States Patent [19]

Kurtz et al.

[11] Patent Number: 4,739,298

[45] Date of Patent: Apr. 19, 1988

[54] HIGH TEMPERATURE TRANSDUCERS AND METHODS OF MANUFACTURING

[75] Inventors: Anthony D. Kurtz, Teaneck; Richard A. Weber, Denville; Timothy A. Nunn, Ridgewood; Joseph R. Mallon, Franklin Lakes, all of N.J.

[73] Assignee: Kulite Semiconductor Products, Inc., Leonia, N.J.

[21] Appl. No.: 706,889

[22] Filed: Feb. 28, 1985

[51] Int. Cl.$^4$ ............................................. G01L 1/22
[52] U.S. Cl. .......................................... 338/2; 338/5; 29/610 SG
[58] Field of Search .................. 29/610 SG; 338/2-5; 73/727

[56] References Cited

U.S. PATENT DOCUMENTS

| | | | |
|---|---|---|---|
| 3,654,579 | 4/1972 | Kurtz et al. | 73/727 |
| 3,800,262 | 3/1974 | Cinquin | 337/276 |
| 3,930,823 | 1/1976 | Kurtz et al. | 65/33 |
| 4,236,137 | 6/1980 | Kurtz et al. | 338/4 |
| 4,400,869 | 8/1983 | Wilner et al. | 29/610 SG X |

Primary Examiner—Harold Broome
Assistant Examiner—M. M. Lateef
Attorney, Agent, or Firm—Arthur L. Plevy

[57] ABSTRACT

A high temperature transducer consists of a first section having a base layer of monocrystalline silicon which layer is coated with an oxide. A thin layer of a high temperature glass is sputtered on the oxide layer of the base layer. A second section is formed by diffusing a wafer of N type silicon to form a p+ layer. The first and second sections are bonded together by an anodic bond where the p+ layer is secured to the glass layer to form a composite structure. The N type material is then removed and piezoresistive devices are formed in the p+ layer. This structure provides a high temperature transducer which exhibits stable operating parameters over a wide operating range.

28 Claims, 2 Drawing Sheets

FIG. 3B  DIFFUSION

HIGH TEMPERATURE TRANSDUCERS AND METHODS OF MANUFACTURING

BACKGROUND OF THE INVENTION

This invention relates to high temperature pressure transducers in general and more particularly to a high temperature transducer exhibiting precise and repeatable operating characteristics over a wide temperature range and methods of making such transducers.

There is a great need for a high temperature pressure transducer for use in areas such as satellite applications, nuclear power testing, chemical processing, aircraft engine testing and flight testing and so on.

One of the most widely used transducers is the semiconductor piezoresistive transducer. These transducers are widely employed due to the high output signals available and the relatively small size of the transducers. The prior art is replete with a number of patents describing various structures and techniques for high temperature transducers. See for example, U.S. Pat. No. 3,930,823, issued on Jan. 6, 1976 to A. D. Kurtz, et al and assigned to the assignee herein.

In that patent there is described a dielectrically isolated pressure transducer which includes a silicon diaphragm having a piezoresistive sensor mounted on the diaphragm by means of a dielectric insulator. The diaphragm is secured about a nonactive peripheral area to an annular ring housing by means of a glass bond. This technique permitted high temperature operation due to the isolation provided by means of the dielectric insulator. See for example, U.S. Pat. No. 3,800,262 entitled HIGH TEMPERATURE TRANSDUCERS AND HOUSINGS INCLUDING FABRICATION METHODS issued on Mar. 26, 1974 to A. D. Kurtz et al.

Essentially, it is desirable to provide a pressure transducer capable of operating at high temperatures such as temperatures above 325 degrees F. Conventional integrated circuit pressure transducers are limited to approximately this temperature because the isolation between the diffused piezoresistive elements and the deflecting flexural structure is accomplished by means of P-N junction isolation. For operation to temperatures of 500 degrees F. and higher some form of dielectric isolation is required. There is disclosed herein a novel structure for achieving such isolation which possesses a number of advantages over pre-existing techniques. It is, of course, further desirable to produce such transducers which exhibit linear operating characteristics over such temperature ranges and in particular which exhibit a minumum amount of creep or hysteresis over the wide temperature ranges.

Furthermore, it is desirable to produce a transducer which possesses minumum temperature induced deviations from its room temperature calibration.

It is, therefore, an object of the present invention to provide an improved high temperature transducer which exhibits such accurate temperature coefficients and which further exhibits reliable linear and repeatable operation over a wide temperature range.

BRIEF DESCRIPTION OF THE PREFERRED EMBODIMENT

A pressure transducer comprising a base layer of single crystal semiconductor material having disposed on a major surface thereof a relatively thin layer of a high temperature glass, at least one piezoresistive element secured to said glass layer and characterized in that said piezoresistive element is formed from a highly doped semiconductor material.

BRIEF DESCRIPTION OF THE FIGURES

FIGS. 3A and 3B depict a series of steps forming a second portion of the transducer.

DETAILED DESCRIPTION OF THE DRAWINGS

Figure 1:
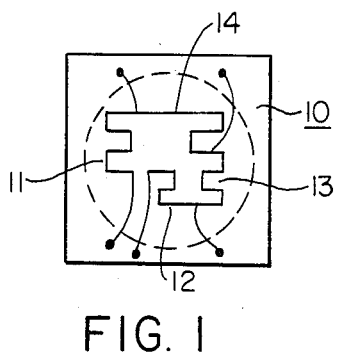
FIG. 1 is a top plan view of a semiconductor transducer according to this invention.

Referring to FIG. 1, there is shown a top plan view of a square transducer structure which as will be explained serves as a high temperature pressure transducer.

Located on the surface of the square semiconductor die 10 are piezoresistors 11-14. These piezoresistors are contained within a round deflecting or diaphragm area 15 which is a thinned area of the die 10 which deflects under an applied pressure. As is seen, the piezoresistors are fabricated on the diaphragm in a circuitous pattern whereby the resistors exhibit a relatively large length to accommodate a relatively large resistance.

It is understood that one or more devices can be deposited upon the diaphragm member by means of the fabrication techniques to be described. While the die is depicted as being square in shape with a round diaphragm area, it is also understood that other shapes can be employed as well. For example, a square diaphragm with a truncated pyrimadal central boss as shown in U.S. Pat. No. 4,236,137 entitled SEMICONDUCTOR TRANSDUCERS EMPLOYING FLEXURE FRAMES issued on Nov. 25, 1980 to A. D. Kurtz et al and assigned to the assignee herein, can be employed.

Circular diaphragms are shown in many U.S. Pat. Nos.; see for example, U.S. Pat. No. 3,654,579 entitled ELECTRO MECHANICAL TRANSDUCERS AND HOUSINGS issued Apr. 4, 1972 to A. D. Kurtz et al and assigned to the assignee herein. The particular geometrical configuration of the transducer as shown in FIG. 1 is relatively conventional. In any event, it is the structure of the transducer and the methods of manufacturing such a transducer that is considered to be the pertinent part of this invention.

Figure 2A:
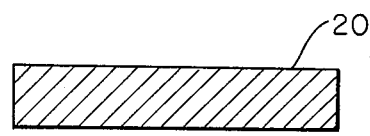
FIGS. 2A to 2C are sectional views depicting a series of steps in forming a portion of the transducer.
Figure 2B:
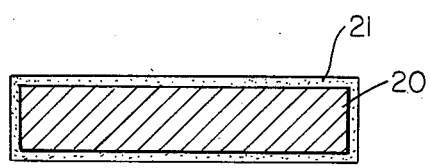

Referring to FIG. 2A, there is shown a wafer 20 which consists of single crystal silicon. The wafer 20 is then treated as shown in FIG. 2B so that a uniform layer 21 of silicon dioxide is grown on the wafer. The silicon dioxide layer is grown so that it covers all surfaces of the wafer 20.

The formation of a layer of silicon dioxide on the wafer 20 is a well known technique and, for example, such a layer can be grown by heating the wafer to a temperature between 1,000 to 1,300 degrees C. for ½ hour to 4 hours and passing oxygen over the surface. The thickness of the layer of silicon dioxide is controlled by time and temperature to be between 5,000 to 20,000 Angstoms thick with 14,000 Angstoms being a convenient value. Such a layer provides very good insulating properties. Better properties in fact then are readily achievable with the sputtered Pyrex layer which will be subsequently deposited. This excellent insulation is beneficial to the final device structure and also allows sealing by the means of anodic or diffusion bonding.

Figure 2C:
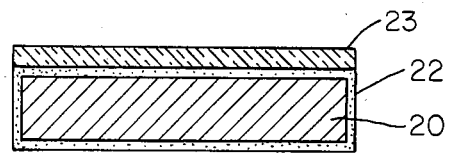

Referring to FIG. 2C, there is shown the wafer 20 with the layer of silicon dioxide 22. The figure further shows a third layer 23 which is a layer of sputtered glass such as a Pyrex glass. The layer of glass 23 is deposited on the top surface of the composite wafer by means of an RF sputtering technique which is a conventional technique employed in integrated circuit manufacture and is a well known and conventional process. Of course other techniques such as reactive sputtering, low pressure chemical vapor deposition and so on may be employed. The layer 23 is deposited upon the silicon dioxide layer 22 by sputtering and may be typically between 2 to 10 microns in thickness with 4 microns being a thickness which has been found to work well. Pyrex glass is one of several glasses that may be employed for the layer 23. Pyrex is a registered trademark of Corning Corporation and this glass is primarily a mixture of $B_2O_3$ and $SiO_2$. The required properties for this layer are that it be a reasonably high melting point glass, have a thermal expansion coefficient compatible with silicon and be suitable for anodic bonding. Pyrex is a glass capable of operating at high temperatures in excess of 800 degrees C. Such a layer 23 is conveniently formed by a sputtering technique, but other techniques for depositing glass can be used as well and in order to provide the layer 23 of required thickness and strength.

Several properties are required of the layer 23. Since a relatively high electric field will be used in subsequent processing, it is necessary that the layer be pinhole free to avoid arcing. This is the reason why two insulating layers 22 and 23 are employed. It has been found that it is advantageous to deposit the Pyrex layer in two steps with an intermediate cleaning step to help to avoid pinholes. It is also necessary that the layer 23 be relatively thick so that the sealing process may be accomplished.

Glasses may contain other fluxing agents such as metal oxides of copper and so on may also be employed. The Pyrex glass is well known and has been extensively employed in fabrication of solid state transducer structures. Such glasses are commonly referred to as borosilicate glasses and are known for their chemical durability and electrical properties coupled with low thermal expansion and high resistance to thermal shock.

Thus as can be seen from FIG. 2C, a composite structure is formed which essentially consists of a wafer 20 of monocrystal or single crystal silicon which wafer is completely coated with a layer of silicon dioxide 22 and which layer of silicon dioxide has deposited upon a top surface a layer of borosilicate glass or Pyrex 23.

Figure 3A:

Referring to FIG. 3A, there is shown a wafer 24 which is high resistivity silicon and may be N type silicon of resistivity 1 Ohm cm. The wafer 24 is congruent to the wafer 20 and essentially is of relatively the same shape and dimensions. The wafer 24 which as indicated is lightly doped with N type impurity which again is a well known and conventional technique.

The wafer 24 as shown in 3B is then subjected to a diffusion process wherein boron is diffused into the lower surface of the wafer 24 to produce a relatively thin diffused layer 25 of a relatively high doping. A P+ layer with a sheet resistivity of 3 Ohms per square may be conveniently employed. Such a layer 25 is conveniently formed by a saturated diffusion of boron at a temperature of 1200 degrees C. for 5 minutes. Such a layer is highly doped and has an error function impurity distribution to form a layer approximately 1.7 microns thick. The formation of heavily doped layers as P+ layers by the use of boron or other diffusing materials is also well known in the semiconductor art. It is, of course, well known that silicon may also be highly doped N type by group V impurities such as P, As Sb and P type by group III impurities such as B, Al, Ga and In.

As indicated, the formation of heavily doped regions such as n+ or p+ regions as shown in FIG. 3 are well known. See for example, a text entitled *Semiconductor Devices and Integrated Electronics* by A. G. Milnes published by Van Nostrand Reinhold Company, 1980.

Figure 4A:
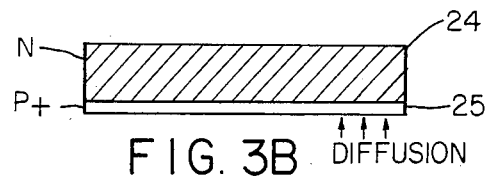
FIGS. 4A to 4D depict a series of steps wherein the first and second sections of the transducer are bonded together to form a composite transducer exhibiting high temperature operation.
Figure 4A:
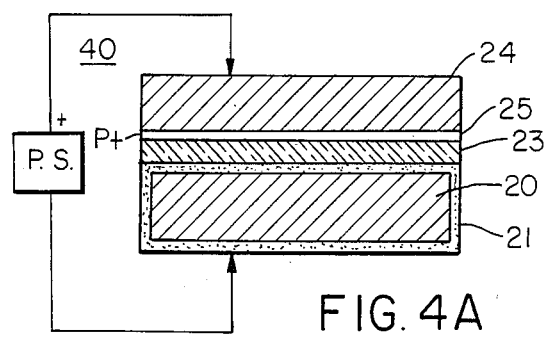

Referring to FIG. 4A, there is shown a composite structure 40 wherein the wafer shown in FIG. 3B is bonded to the wafer shown in FIG. 2C. This is accomplished as follows. The p+ surface of the wafer 24 of N type silicon is placed upon the surface of the single crystal wafer 20 which has formed thereon the glass layer 23. The two wafers are held in contact with the p+ region in direct contact with the Pyrex glass layer 23. The two wafers may be held in contact with a suitable pressure and then subjected to an electrical current. A temperature of 450 degrees C. with a voltage of 200 volts is employed to allow the semiconductor to bond to the glass under a suitable pressure.

The seal forms in typically 15 minutes. This technique is sometimes referred to as anodic bonding. The process is well known and essentially allows one to bond a semiconductor or metallic layer to a glass layer.

Thus by using such a bond, one can now secure the composite wafer of FIG. 2C to the composite wafer of FIG. 3B to form the structure shown in FIG. 4A. Such a bond has been found to be very strong approaching 60 to 100% of the strength of the silicon itself.

Figure 4B:
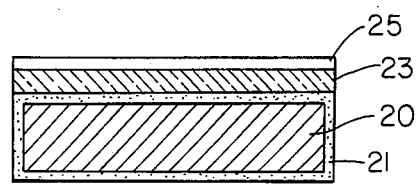
Figure 4C:
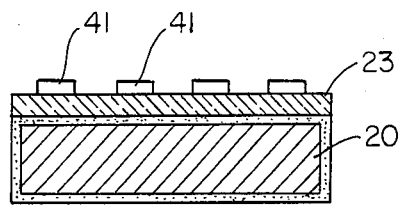

Referring to FIG. 4B, there is seen the composite structure with the p+ layer 25 depicted as the top layer. The layer of N type silicon is now removed by selective etching. It is known that certain etches such as potassium hyroxide (KOH) hydrazine and other etchants will selectively remove N type silicon without effecting the p+ layer 25. It has been found that a mixture of 85% hydrated hydrazine in water is a very effective etch stopping off at the P+ layer while not etching the $SiO_2$ protected wafer 21. Ocassionally pinholes are found in the oxide layer covering the lower surface of the wafer 21. These can be reduced by protection with a 3000 Angstroms Chrome layer. More over this wafer can be made of (111) oriented silicon. Such an orientation has a very low etch rate in KOH or hydrazine based etches and thus is very resistant to the formation of pinholes. The N type layer is completely removed leaving the structure shown in FIG. 4B.

Thus as one can see from FIG. 4B, the structure consists of a bottom wafer 20 of single crytal silicon which is coated with a layer 21 of silicon dioxide. A suitable surface of the layer of silicon dioxide 21 has secured thereto a thin layer 23 of glass which is a high temperature glass which in turn has secured thereto another thin layer of p+ silicon. The layer 25 may now be treated by means of conventional masking techniques to produce piezoresistive devices as 41 on the surface. It should be noted that the layer is very thin. Thus it is possible to form by etching very narrow piezoresistors with a high aspect ratio (length/width). Thus relatively highly doped (low resistivety) material can be used for the piezoresistors while maintaining a suitably high gage resistance. This is opposed to the conventional technique of dielectric isolation for instance employed in U.S. Pat. No. 3,800,264, HIGH TEMPERATURE TRANSDUCERS AND HOUSINGS INCLUDING FABRICATION METHODS issued to Anthony D. Kurtz and Joseph R. Mallon Jr. and assigned to the assignee herein. The conventional techniques of dielectric isolation is essentially a mechanical method employing backlapping to define the resistor structure and is capable of producing relatively crude geometries. Thus relatively lightly doped piezoresistors must be employed.

The difference is critical to the performance of the device. Lightly doped resistor elements exhibit relatively high temperature coefficients of resistance (100% resistance change over −65 degrees F. to 45 degrees F.) and a relatively high temperature coefficient of sensitivity (50% change in sensitivity over −65 degrees F. to 450 degrees F.). Highly doped piezoresistors however exhibit much smaller changes 50% and 10% respectively for TCR and TCS over the same temperature range. Such smaller coefficients are obviously very desirable. More over the coefficients of the highly doped material are more linear. Finally the analog compensation techniques generally employed in such devices introduce addittional non-linearities. These non-linearities are larger for initially larger coefficients. For instance, it can be shown that the best compensation achievable through analog techniques for TCS is limited by the curvature in the compensated sensitvity versus temperature curve and this curvature is proportional to the product of the uncompensated TCR and TCS. Obviously highly doped piezoresistors may be used to provide more accurate devices particularly if they are to be used over a wide temperature range. The formation of such devices from p+ materials is well known and many conventional techniques may be employed.

For example as shown in FIG. 1, longitudinal piezoresistive elements such as 11 of FIG. 1 may be fabricated by a photolithographic technique in conjunction with a suitable etching whereby the p+ layer is treated to form a piezoresistor which piezoresistor 41 is positioned on the layer of glass 23. In this manner the piezoresistive device 41 is dielectrically isolated from the semiconductor wafer 20 by means of the glass layer. The p+ transducer which as indicated is highly doped and exhibits a linear temperature coefficient over a wide temperature range.

Figure 4D:
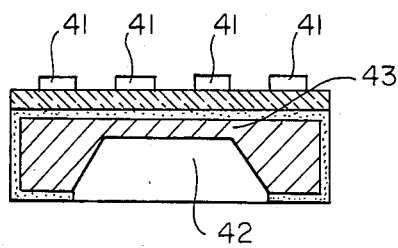

As a final step in the process, as shown in FIG. 4D, a suitable aperture 42 may be etched in the wafer 20 to form a diaphragm section 43 for the transducer which diaphragm section consists of a thin area 43 of the single crystal silicon which will deflect upon application of a force to the structure. In this manner the aperture 42 as is conventionally described in the prior art defines an active area for diaphragm deflection. Of course this aperture can be etched by photolithography, oxide masking and isotropic etching. However, a particular object of this invention is to fabricate a structure with a single crystal diaphragm. Such a diaphragm is machinable with anisotropic etchants. Using such etches more complex structures can be employed for instance the structure shown in U.S. Pat. No. 4,236,137, can be used to achieve high outputs at low pressures.

A further advantage of the single crystal diaphragm is that it is stronger, less hysteretic and more creep free than the polycrystal diaphragms employed for instance in U.S. Pat. No. 3,800,264 previously referenced.

Thus as one can see, the above described techniques produce a high temperature transducer which employes p+ piezoresistive devices which are dielectrically isolated by means of a glass and silicon dioxide layer from a single crystal silicon diaphragm. Such devices exhibit excellent properties over wide temperature ranges. As compared to prior art techniques, the process of fabrication strictly employs semiconductor techniques as for example using diffusion, sputtering, anodic bonding and so on. Thus the processes depicted and described eliminate the need for mechanical processes which were widely employed in the fabrication of high temperature transducers according to the prior art.

In such prior art techniques one employed mechanical processes such as lapping and machining in order to provide the high temperature devices. Due to the formation of the p+ layer, one produces resistive patterns such as the pattern 11 of FIG. 1 which patterns consist of extremely narrow line widths. Hence resistors of greater length can be accommodated on wafers of relatively small areas. One can form the resistor in the p+ type area by the use of isotropic or anisotropic etchants.

The aperture 42 which is formed in the bottom surface of the transducer as indicated form the active area and the peripheral flange enables the transducer to be mounted to a suitable housing.

Figure 5:
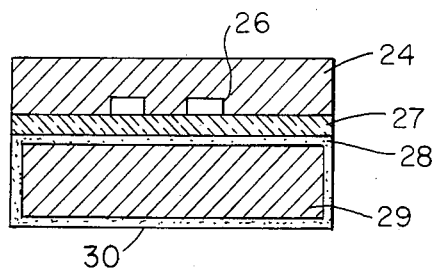
FIG. 5 is a cross sectional view of an alternate embodiment of a transducer structure according to this invention.

Referring to FIG. 5, an alternate embodiment of the structure is depicted. This process proceeds as follows. First a wafer of silicon, silicon dioxide and Pyrex is formed as in FIG. 2C. Second a prepatterned highly doped diffusion is performed in a lightly doped wafer 24. This diffusion forms a patterned piezoresistive structure by conventional photolithography oxide masking and diffusion. The wafers are then sealed by anodic bonding and the process proceeds as above. The advantage of this technique is that the piezoresistive structure is formed by photo-masking of an oxide layer and diffusion and can be done more precisely than by chemically milling a diffused sheet of highly doped material thus it is possible to form even narrower structures by this fabrication process. Note the sealing of the second wafer to the first wafer can be fabricated by slightly raising the piezoresistor pattern so that it stands upward from the surface. This can be accomplished by removing the masking oxide layer and etching the wafer so that the field is depressed and the resistor structure slightly raised allowing for better contact in the anodic bonding process.

In any event, both embodiments as described above offer the advantages of forming an extremely temperature stable device which due to the fabrication techniques eliminates mechanical operations such as the steps of lapping and polishing which were required in fabricating high temperature devices according to many of the prior art techniques.

It will be apparent to those skilled in the art that the above noted structure exhibits substantive advantages in regard to high temperature operation, and other embodiments may be discerned which are deemed to be encompassed within the spirit and scope of the claims appended hereto.

We claim:

1. A pressure transducer comprising:

a base layer of single crystal semiconductor material having disposed on a major surface thereof a relatively thin layer of high temperature glass of a thickness between 2-12 microns, at least one piezoresistive element secured to said glass layer and characterized in that said piezoresistive element is formed from a highly doped semiconductor material and secured to said glass layer by means of an anodic bond.

2. The pressure transducer according to claim 1 wherein there is an insulating layer on said single crystal semiconductor material to which layer said layer of glass is secured.

3. The pressure transducer according to claim 1 wherein said base layer is monocrystalline silicon.

4. The pressure transducer according to claim 1 wherein said high temperature glass is Pyrex.

5. The pressure transducer according to claim 1 wherein said piezoresistive element is formed from p+ doped silicon.

6. The pressure transducer according to claim 1 wherein said base layer of single crystal semiconductor material has an aperture formed in a major surface opposite said surface containing said thin glass layer to define an active deflection area for said piezoresistive element.

7. The pressure transducer according to claim 2 wherein said insulating layer is a layer of silicon dioxide.

8. A method of fabricating a high pressure transducer comprising the steps of:
coating the surfaces of a first wafer of single crystal semiconductor with a thin layer of oxide,
depositing a thin layer of high temperature glass having a thickness between 2-12 microns on a major surface of said first wafer as covered by said oxide,
diffusing a major surface of a second wafer of semiconductor material of a given conductivity to form a highly doped layer at said surface of said second wafer,
bonding said second wafer to said first wafer with said highly doped layer in contact with said glass layer by holding said first wafer and said second wafer in contact via a pressure and passing a current through to bond said wafers together via an anodic bond at a temperature of about 450° C. with a voltage of 200 volts at a surface pressure,
forming a piezoresitive element from said highly doped layer.

9. The method according to claim 8 wherein said high temperature glass is deposited by sputtering Pyrex on said major surface.

10. The method according to claim 8 wherein the step of diffusing includes diffusing boron into a surface of a second wafer of N type silicon to form a highly doped p+ layer.

11. The method according to claim 8 wherein said first wafer of single crystal semiconductor is silicon with said thin layer coating the same being silicon dioxide.

12. The method according to claim 8 wherein the step of removing all of said semiconductor material of said given conductivity includes etching said semiconductor material with a selective etchant which attacks low resistivity type silicon without affecting p+ silicon.

13. The method according to claim 8 wherein said piezoresistive element is formed as a longitudinal piezoresistor.

14. The method according to claim 8 further including the step of forming an aperture in said first wafer on a surface opposite to the surface deposited with said high temperature glass.

15. The method according to claim 14 where the step of forming an aperture is accomplished by the use of an anisotropic etchant which preferentially attacks certain crystal planes.

16. The method according to claim 8 wherein said layer of oxide is between 5,000 to 20,000 Angstroms thick.

17. The method according to claim 8 wherein the step of forming said piezoresistive element comprises etching said highly doped layer to form a line resistive pattern.

18. A method of fabricating a high pressure transducer comprising the steps of:
coating the surfaces of a first wafer of single crystal semiconductor with a thin layer of oxide,
depositing a thin layer of high temperature glass on a major surface of said first wafer as covered by said oxide, said glass layer being between 2-12 microns thick,
prepatterning a major surface of a second wafer with a masking oxide with windows for a piezoresistor patter,
diffusing said surface of said second wafer of semiconductor material of a given conductivity to form a highly doped layer at said surface of said second wafer,
bonding said second wafer to said first wafer with said highly doped layer in contact with said glass layer by holding said first and second wafers in contact via a pressure and passing a current through to bond said wafers together via an anodic bond at a temperature of about 450° C. at a voltage of 200 volts and at a surface pressure,
removing said masking oxide from said second wafer,
forming a piezoresistive element from said highly doped layer.

19. The method according to claim 18 wherein said high temperature glass is deposited by sputtering Pyrex on said major surface.

20. The method according to claim 18 wherein the step of diffusing includes diffusing boron into a surface of a second wafer of N type silicon to form a highly doped p+ layer.

21. The method according to claim 18 wherein said first wafer of single crystal semiconductor is silicon with said thin layer coating the same being silicon dioxide.

22. The method according to claim 19 where the piezoresistor is slightly raised from the surface of said second wafer by etching prior to bonding said second wafer to said first wafer.

23. The method according to claim 19 wherein the step of removing all of said semiconductor material of said given conductivity includes etching said semiconductor material with a selective etchant which attacks N type silicon without affecting p+ silicon.

24. The method according to claim 19 wherein said piezoresistive element is formed as a longitudinal piezoresistor.

25. The method according to claim 18 further including the step of forming an aperture in said first wafer on a surface opposite to the surface deposited with said high temperature glass.

26. The method according to claim 18, further including the steps of forming a layer of dioxide on the surface of said second wafer opposite the surface containing said highly doped layer, diffusing said second wafer with impurities to form piezoresistive devices in said highly doped layer with each of said steps performed prior to the second step of removing.

27. The method accoring to claim 18 wherein said layer of oxide is between 5,000 to 20,000 Angstroms thick.

28. The method according to claim 18 wherein the step of forming said piezoresistive element comprises etching said highly doped layer to form a line resistive pattern.

* * * * *